(12) United States Patent
Tamai et al.

(10) Patent No.: US 12,358,408 B2
(45) Date of Patent: Jul. 15, 2025

(54) SEAT FOR VEHICLE

(71) Applicant: TACHI-S CO., LTD., Akishima (JP)

(72) Inventors: Takamasa Tamai, Akishima (JP); Osamu Takano, Akishima (JP); Riho Maruyama, Akishima (JP)

(73) Assignee: TACHI-S CO., LTD., Tokyo (JP)

( * ) Notice: Subject to any disclaimer, the term of this patent is extended or adjusted under 35 U.S.C. 154(b) by 52 days.

(21) Appl. No.: 18/078,030

(22) Filed: Dec. 8, 2022

(65) Prior Publication Data

US 2023/0226960 A1  Jul. 20, 2023

(30) Foreign Application Priority Data

Jan. 14, 2022 (JP) .................................. 2022-004159

(51) Int. Cl.
*B60N 2/70* (2006.01)

(52) U.S. Cl.
CPC .......... *B60N 2/7011* (2013.01); *B60N 2/7035* (2013.01)

(58) Field of Classification Search
CPC ............................. B60N 2/7011; B60N 2/7035
See application file for complete search history.

(56) References Cited

U.S. PATENT DOCUMENTS

| | | | | |
|---|---|---|---|---|
| 4,939,183 A * | 7/1990 | Abu-Isa | ............... | B60N 2/7011 521/61 |
| 9,738,196 B2 * | 8/2017 | Ogura | .................. | B60N 2/7011 |
| 10,899,457 B2 * | 1/2021 | Ballocchi | ........... | B64D 11/0619 |
| 11,220,196 B1 * | 1/2022 | Alexander | ............... | B60N 2/72 |
| 2010/0201178 A1 * | 8/2010 | Mizobata | ............. | B60N 2/5825 297/452.35 |
| 2012/0248839 A1 * | 10/2012 | Fujita | ................. | B64D 11/0647 297/452.48 |
| 2014/0125108 A1 * | 5/2014 | Kurashita | ............ | B60N 2/7011 297/452.18 |

(Continued)

FOREIGN PATENT DOCUMENTS

| | | | | |
|---|---|---|---|---|
| CN | 101712291 A | * | 5/2010 | ....... B29C 45/14631 |
| CN | 117944551 A | * | 4/2024 | ............. B60N 2/002 |

(Continued)

OTHER PUBLICATIONS

Office Action issued Feb. 4, 2025, in Japanese Patent Application No. 2022-004159.

*Primary Examiner* — Timothy J Brindley
(74) *Attorney, Agent, or Firm* — Potomac Law Group, PLLC (57) ABSTRACT

A seat for a vehicle is provided which is capable of minimizing excessive depression in a region of a sheet-shaped elastic material corresponding to an occupant's buttocks while reducing components in a seat cushion employing a sheet-shaped elastic material. The seat cushion of the vehicle seat includes: a cushion pad; a left side frame; a right side frame; a front frame disposed between a front portion of the right side frame and a front portion of the left side frame; a rear frame disposed between a rear portion of the right side frame and a rear portion of the left side frame; and a sheet-shaped elastic material disposed between the front frame and the rear frame to support the cushion pad from below. The sheet-shaped elastic material includes a rigid reinforcement portion to minimize an amount of stretch of the sheet-shaped elastic material in a front-rear direction.

5 Claims, 12 Drawing Sheets

(56) References Cited

U.S. PATENT DOCUMENTS

| | | | |
|---|---|---|---|
| 2014/0339878 A1 | 11/2014 | Ogura et al. | |
| 2017/0283071 A1* | 10/2017 | Velasco | B64D 11/06 |
| 2017/0327021 A1* | 11/2017 | Okui | B60N 2/5833 |
| 2018/0105274 A1* | 4/2018 | Udriste | B64D 11/0647 |

FOREIGN PATENT DOCUMENTS

| | | | | |
|---|---|---|---|---|
| DE | 102019220141 A1 * | 6/2021 | | B60N 2/64 |
| EP | 2965944 A1 * | 1/2016 | | A47C 7/18 |
| EP | 3862221 A1 * | 8/2021 | | B60N 2/1839 |
| JP | 2005328858 A * | 12/2005 | | |
| JP | 4066034 B2 * | 3/2008 | | |
| JP | 2013-112084 A | 6/2013 | | |
| JP | 2015-136962 A | 7/2015 | | |
| JP | 2017-149235 A | 8/2017 | | |
| KR | 20180037117 A * | 4/2018 | | |
| WO | WO 2016/098672 A1 | 6/2016 | | |
| WO | WO-2023046591 A1 * | 3/2023 | | B60N 2/026 |

\* cited by examiner

SEAT FOR VEHICLE

CLAIM OF PRIORITY

The present application claims priority from Japanese Patent Application JP 2022-004159 filed on Jan. 14, 2022, the content of which is hereby incorporated by reference into this application.

BACKGROUND OF THE INVENTION

The present invention relates to a seat for a vehicle and, more particularly, to an effective technique when applied to a vehicle seat having a seat cushion using a sheet-shaped elastic material.

A seat for a vehicle is known which employs a sheet-shaped elastic material such as a fabric spring for a seat cushion. Such a type of seats for vehicles is disclosed by, for example, International Publication WO2016/098672, Japanese Published Unexamined Application JP 2005-328858, and the like.

In use of the sheet-shaped elastic material such as a fabric spring for the seat cushion, the sheet-shaped elastic material is installed to support the underside of a cushion pad. In this case, since the fabric spring itself is elasticized, seat deformation (depression) may possibly be caused in a portion of the fabric spring corresponding to buttocks. Large seat deformation (depression) may possibly make seating uncomfortable.

SUMMARY OF THE INVENTION

It is an object of the present invention to provide a seat for a vehicle which is capable of minimizing excessive depression in a region of a sheet-shaped elastic material corresponding to the buttocks of an occupant while reducing components in a seat cushion employing a sheet-shaped elastic material.

These and other problems and novel features will be apparent from a reading of the following description in the specification and a review of the associated drawings.

The following is a brief description of a summary of a typical embodiment of the present invention.

A seat for a vehicle according to one embodiment includes:
  a seat cushion; and
  a seatback coupled to the seat cushion in a tiltable manner.
The seat cushion includes:
  a cushion pad;
  a left side frame;
  a right side frame;
  a front frame disposed between a front portion of the right side frame and a front portion of the left side frame;
  a rear frame disposed between a rear portion of the right side frame and a rear portion of the left side frame; and
  a sheet-shaped elastic material disposed between the front frame and the rear frame to support the cushion pad from below.
The sheet-shaped elastic material includes a rigid reinforcement portion to minimize an amount of stretch of the sheet-shaped elastic material in a front-rear direction.

With the seat for a vehicle, it is possible to minimize the depression of the portion corresponding to buttocks.

DETAILED DESCRIPTION OF THE PREFERRED EMBODIMENTS

Embodiments according to the present invention will now be described with reference to the accompanying drawings.

It is to be understood that the disclosure is merely illustrative, and for the purpose of providing a clearer description, the figures may show schematically a width, a thickness, a shape, and the like of each portion as compared to practical implementations, but the present invention should not be construed as being limited to the figures. Further, throughout the specification and the individual figures, like reference signs are used to indicate similar elements to one shown in a previously discussed figure and a detailed description is omitted as appropriate. Furthermore, in each figure, arrow FRONT represents the forward direction of the vehicle, arrow REAR represents the rearward direction of the vehicle, arrow LEFT represents the leftward direction of the vehicle, arrow RIGHT represents the rightward direction of the vehicle, arrow UP represents the upward direction of the vehicle, and arrow DOWN represents the downward direction of the vehicle. Furthermore, in the following description, unless otherwise specified, the terms "front", "rear/back", "up/top", "down/bottom", "left" and "right" as used herein mean the front, rear, up, down, left and right relative to the vehicle.

Embodiments

Figure 1:
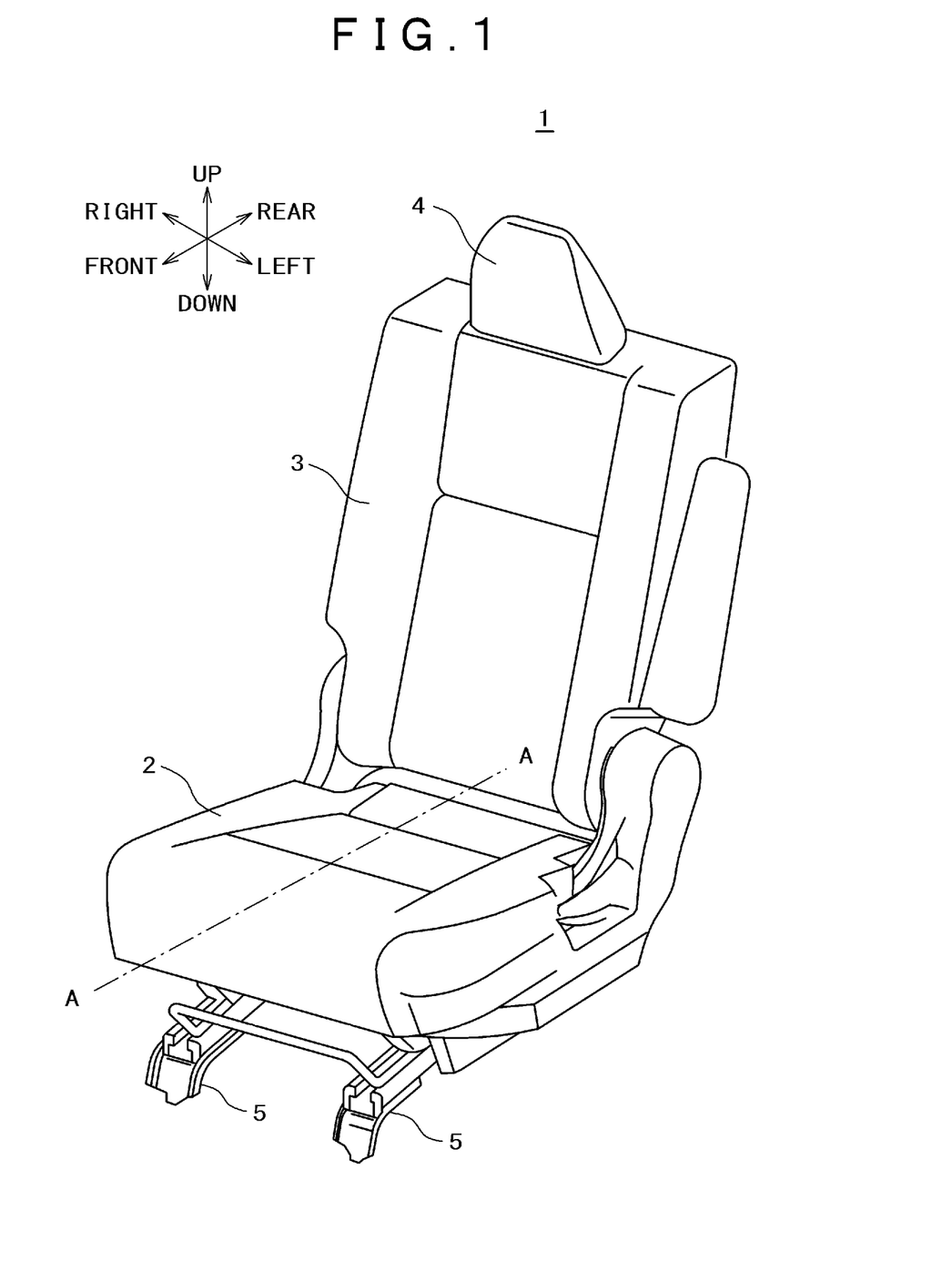
FIG. 1 is a perspective view illustrating a seat for a vehicle according to embodiments.

FIG. 1 is a perspective view illustrating a seat for a vehicle according to embodiments.

As illustrated in FIG. 1, a vehicle seat 1 includes: a seat cushion 2; a seatback 3 that is attached to the seat cushion 2 in a tiltable manner; a headrest 4 that is attached to an upper portion of the seatback 3; and a pair of left and right seat rails 5 that are attached to the underside of the seat cushion 2. The seat cushion 2 constitutes a seating face and the seatback 3 constitutes a backrest. The vehicle seat 1 has a reclining mechanism (not shown/omission) for allowing the angle between the seat cushion 2 and the seatback 3 to be adjusted, and the seat cushion 2 and the seatback 3 are coupled together through the reclining mechanism.

Figure 2:
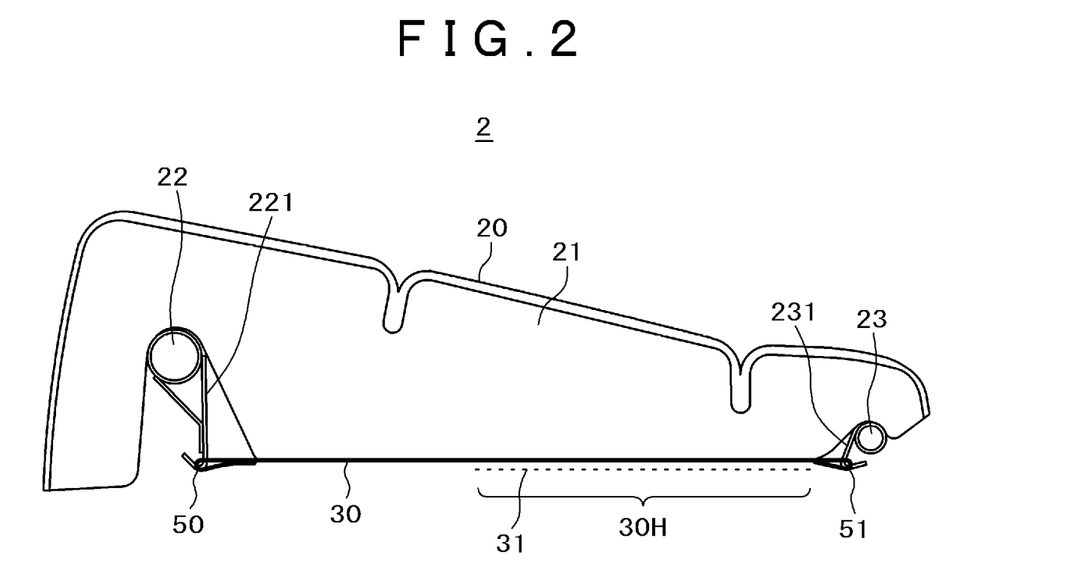
FIG. 2 is a cross sectional view of a seat cushion taken along A-A line of FIG. 1.
Figure 3:
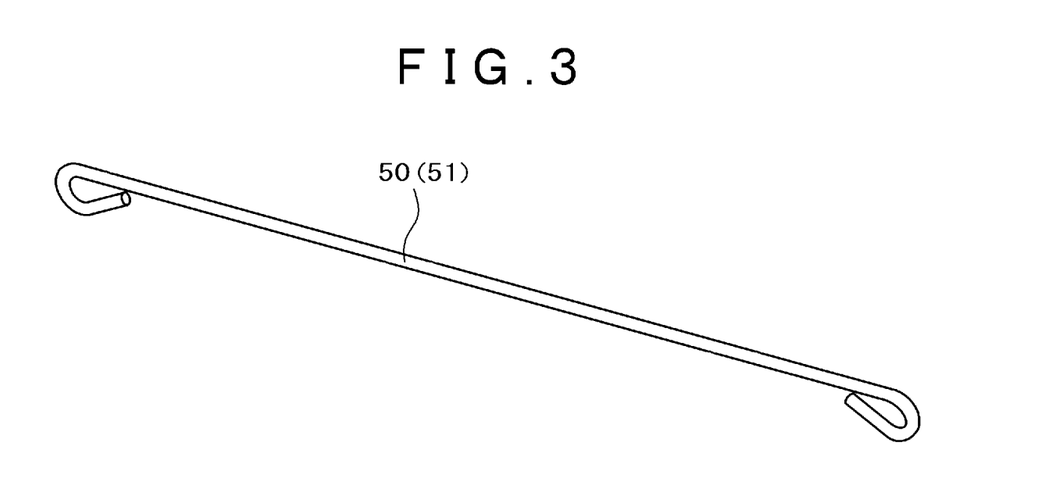
FIG. 3 is a diagram illustrating an example configuration of a fixing wire in FIG. 2.

FIG. 2 is a cross sectional view of the seat cushion taken along A-A line of FIG. 1. FIG. 3 is a diagram illustrating an example configuration of a fixing wire 50, 51 in FIG. 2.

The seat cushion 2 has a surface skin 20 installed on the surface of the seat cushion 2, and a cushion pad 21 covered with the surface skin 20. The seat cushion 2 further has a seat cushion frame (27) which will be described later. The seat cushion frame (27) has a front pipe frame 22, a rear pipe frame 23, a right side frame (24) which will be described later, and a left side frame (25) which will be described later. The front pipe frame 22 is installed between a front portion of the right side frame (24) and a front portion of the left side frame (25). The rear pipe frame 23 is installed between a rear portion of the right side frame (24) and a rear portion of the left side frame (25). The cushion pad 21 is installed on the front pipe frame 22, the rear pipe frame 23, the right side frame (24), and the left side frame (25). It should be understood that the front pipe frame 22 and the rear pipe frame 23 may be a front frame and a rear frame without using pipes.

The seat cushion 2 further has a sheet-shaped elastic material 30 that is installed to support the underside of a cushion pad 21. The sheet-shaped elastic material 30 may also be referred to as a fabric spring, a sheet-shaped elastic support, a flexible sheet-shaped member, or a sheet-shaped support. The sheet-shaped elastic material 30 is secured between front fixing components 221 installed on the front pipe frame 22 and rear fixing components 231 installed on the rear pipe frame 23 by the front fixing wire (core) 50 and the rear fixing wire (core) 51. This makes it possible for the sheet-shaped elastic material 30 to support the underside of the cushion pad 21.

Since the sheet-shaped elastic material 30 itself is elasticized, seat deformation (depression) may possibly be caused in a region 30H of the sheet-shaped elastic material 30 corresponding to buttocks of an occupant. Large seat deformation (depression) may possibly make seating uncomfortable. The sheet-shaped elastic material 30 in FIG. 2 is provided with a rigid reinforcement portion 31 at least in the region 30H so as to increase the rigidity of the sheet-shaped elastic material 30 in the region 30H, i.e., to minimize excessive depression of the region 30H of the sheet-shaped elastic material 30 corresponding to the buttocks of the occupant.

An example configuration of the sheet-shaped elastic material 30 described in FIG. 4 to FIG. 10 will be described below with reference to FIG. 11 before the rigid reinforcement portion 31 for minimizing the depression is described with reference to FIG. 4 to FIG. 10.

Figure 11:
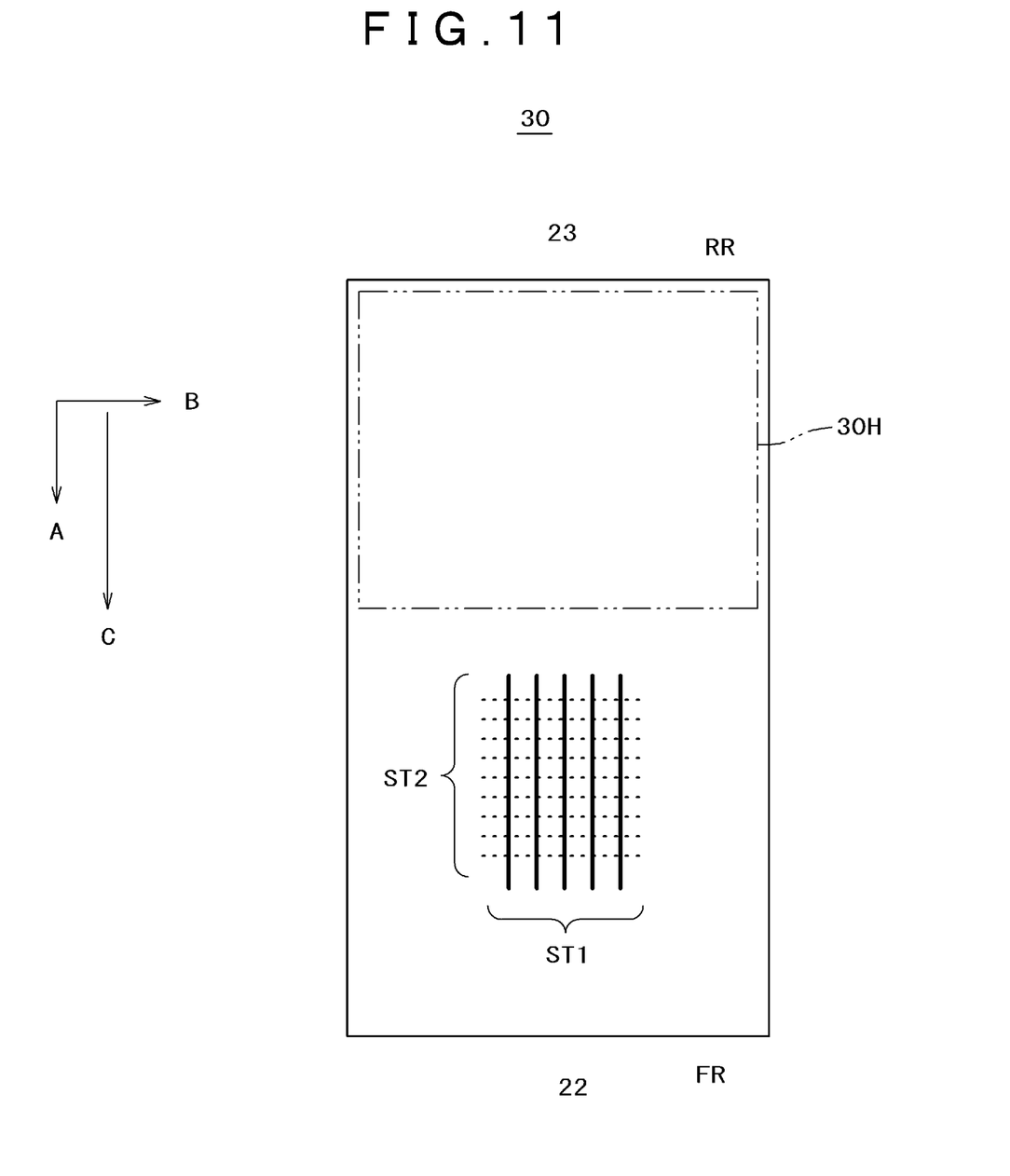
FIG. 11 is a diagram illustrating an example configuration of a sheet-shaped elastic material.

FIG. 11 is a diagram illustrating an example configuration of the sheet-shaped elastic material. FIG. 11 illustrates a plan view of the sheet-shaped elastic material 30 as viewed from above. The sheet-shaped elastic material 30 is installed between the front pipe frame 22 in a front portion (indicated with FR) of the seat cushion frame 27 and the rear pipe frame 23 in a rear portion (indicated with RR) of the seat cushion frame 27.

As illustrated in FIG. 11, the sheet-shaped elastic material 30 has a plurality of first threads ST1 with high stretchability and a plurality of second threads ST2 with less stretchability than the first threads ST1. It may be considered that the first threads ST are composed of stretchy threads and the second threads ST2 are composed of non-stretchy threads.

The plurality of first threads ST1 are installed to run parallel to one another in a first direction A while the plurality of second threads ST2 are installed to run parallel to one another in a second direction B crossing the first direction A. The plurality of first threads ST1 are used, for example, as warp threads while the plurality of second threads ST2 are used, for example, as weft threads, and the weft threads are interlaced with the warp threads to form the sheet-shaped elastic material 30. In the example, the first direction A is the front-rear direction of the vehicle seat 1. In the example, the second direction B is the left-right direction of the vehicle seat 1.

Therefore, the first threads ST1 running along the first direction A are longer in length. For example, when a pedal such as an accelerator pedal, a brake pedal or the like is depressed, a load such as the weight of the occupant is applied to the region 30H corresponding to the buttocks of the occupant shown by in a dash-dot-dot line. At this time, since the first threads ST1 running along the first direction A have a longer length, the first threads ST1 stretch in a direction C parallel to the first direction A (the front-rear direction of the vehicle seat 1). A large amount of stretch in the direction C may possibly cause seat deformation (depression). In turn, large seat deformation (depression) may make seating uncomfortable.

To address this, in order to increase the rigidity of the sheet-shaped elastic material 30, at least, in the region 30H, i.e., to minimize excessive depression in the region 30H, a rigid reinforcement portion 31 is installed in the sheet-shaped elastic material 30.

FIRST EXAMPLE CONFIGURATION

Figure 4:
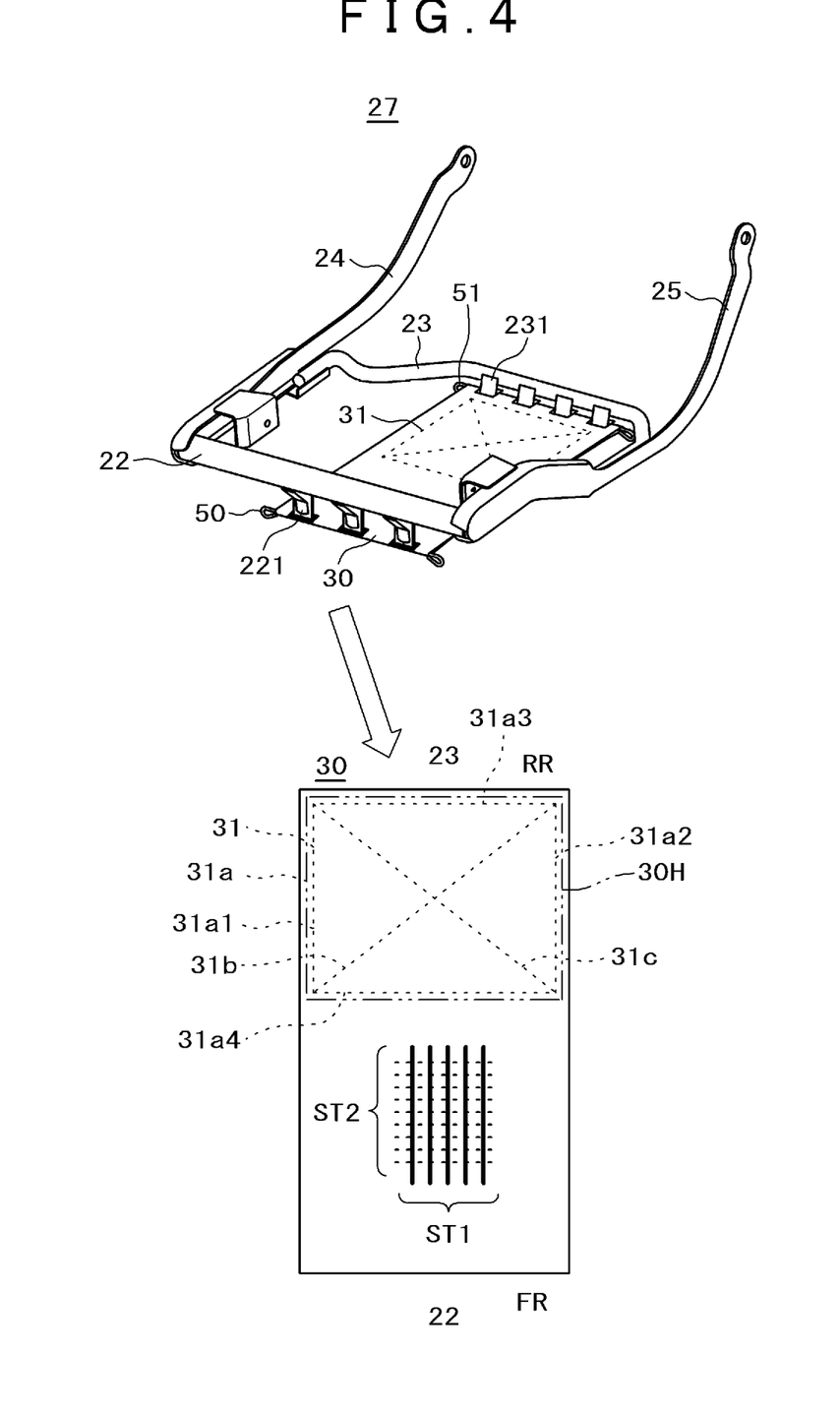
FIG. 4 is a diagram illustrating a first example configuration of a sheet-shaped elastic material installed in a seat cushion frame.

FIG. 4 is a diagram illustrating a first example configuration of the sheet-shaped elastic material installed in the seat cushion frame. In the example configuration in FIG. 4, the rigid reinforcement portion 31 is installed in the region 30H of the sheet-shaped elastic material 30. As illustrated in an enlarged plan view of the sheet-shaped elastic material 30, the rigid reinforcement portion 31 in the example is composed of a first sewing yarn 31a formed in a rectangular shape and a pair of second and third sewing yarns 31b, 31c forming diagonals of the rectangular shape. The sewing yarns 31a, 31b, 31c may also be referred to as stitches. The sewing yarns 31a, 31b, 31c can be formed by, e.g., a sewing machine.

As used herein, the term "stitch" means visible stitching of a sewing machine, unlike inner stitching (stitching on the inside).

The first sewing yarn 31a is composed of a first side 31a1, a second side 31a2 opposite to the first side 31a1, a third side 31a3 running between the first side 31a1 and the second side 31a2, and a fourth side 31a4 opposite to the third side 31a3. The second sewing yarn 31b is installed between an intersection point of the first side 31a1 and the fourth side 31a4 and an intersection point of the second side 31a2 and the third side 31a3. The third sewing yarn 31c is installed between an intersection point of the first side 31a1 and the third side 31a3 and an intersection point of the second side 31a2 and the fourth side 31a4.

Specifically, in the example of FIG. 4, stitching the sewing yarns 31a, 31b, 31c in the region 30H provides minimization of stretchability of the plurality of first threads located within the range of the region 30H. In this way, only by addition of the sewing yarns 31a, 31b, 31c without increasing components, minimization of excessive depression of the region 30H is achieved at low cost. By virtue of this, the amount of stretch in the direction C (the front-rear direction of the vehicle seat 1, see FIG. 11) of the sheet-shaped elastic material 30 may be limited, which in turn may limit the excessive seat deformation (depression) so that the seating comfort can be improved.

The stitches (31a, 31b, 31c) are not limited to the example configuration in FIG. 4. Changing the configuration of stitches enables adjustment of the amount of stretch in the direction C of the sheet-shaped elastic material 30, or adjustment of the seating comfort.

SECOND EXAMPLE CONFIGURATION

Figure 5:
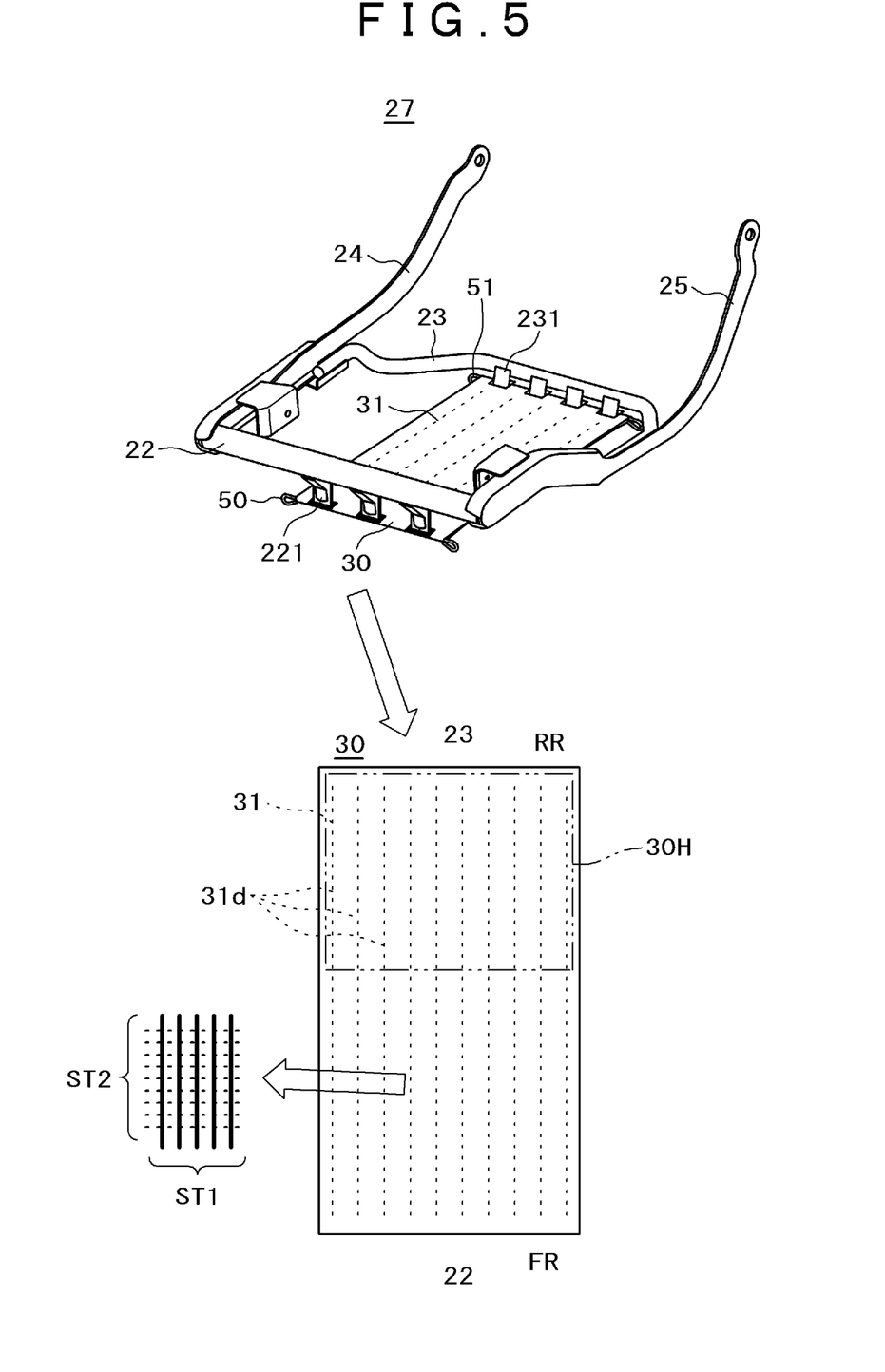
FIG. 5 is a diagram illustrating a second example configuration of a sheet-shaped elastic material installed in a seat cushion frame.

FIG. 5 is a diagram illustrating a second example configuration of a sheet-shaped elastic material installed in a seat cushion frame. As illustrated in an enlarged plan view of the sheet-shaped elastic material 30, in the example, the rigid reinforcement portion 31 installed in the region 30H of the sheet-shaped elastic material 30 is composed of a plurality of sewing yarns (referred to also as stitches) 31d that run parallel to one another in the direction C (the front-rear direction of the vehicle seat 1). In the example, the sewing yarns 31d are designed to be longer in length than the region 30H in the direction C, and roughly comparable in length to the sheet-shaped elastic material 30 in the direction C.

In the example, the plurality of sewing yarns 31d, which run parallel to one another along the direction C, limit the stretchability of the plurality of first threads ST1 throughout the direction C of the sheet-shaped elastic material 30. By virtue of this, the amount of stretch may be limited throughout the direction C of the sheet-shaped elastic material 30, which in turn may limit the excessive seat deformation (depression) so that the seating comfort can be improved. By changing the total number of sewing yarns 31d in the second direction B, the amount of stretch in the direction C of the sheet-shaped elastic material 30 may be adjusted and also the seating comfort may be adjusted.

First Modification

Figure 6:
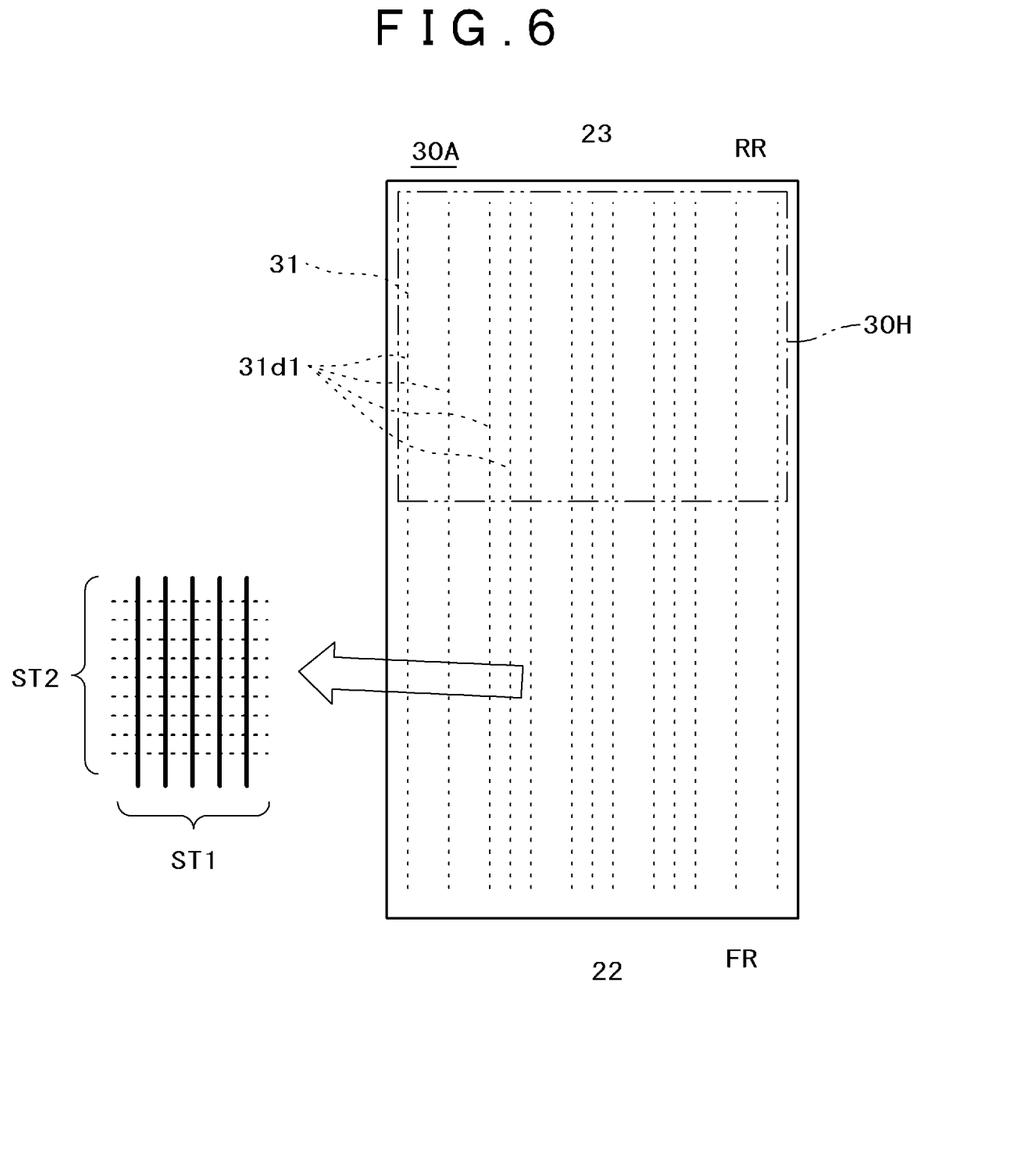
FIG. 6 is a diagram illustrating a first modification of the rigid reinforcement portion in FIG. 5.

FIG. 6 is a diagram illustrating a first modification of the rigid reinforcement portion in FIG. 5. As illustrated in FIG. 6, in the first modification of the rigid reinforcement portion 31 installed in a sheet-shaped elastic material 30A, a plurality of sewing yarns (referred to also as stitches) 31d1, which run parallel to one another in the direction C (the front-rear direction of the vehicle seat 1), have portions of dense arrangements and sparse arrangements in the left-right direction of the vehicle seat 1. Specifically, the sewing yarns 31d1 may be densely arranged in a portion of the sheet-shaped elastic material 30A to which a large weight (load), of buttocks, femoral regions, and the like is to be applied, whereas the sewing yarns 31d1 may be sparsely arranged in a portion of the sheet-shaped elastic material 30A without the application of such a large load of buttocks, femoral regions, and the like. By virtue of this, the excessive seat deformation (depression) may be limited so that the seating comfort can be improved.

Second Modification

Figure 7A:
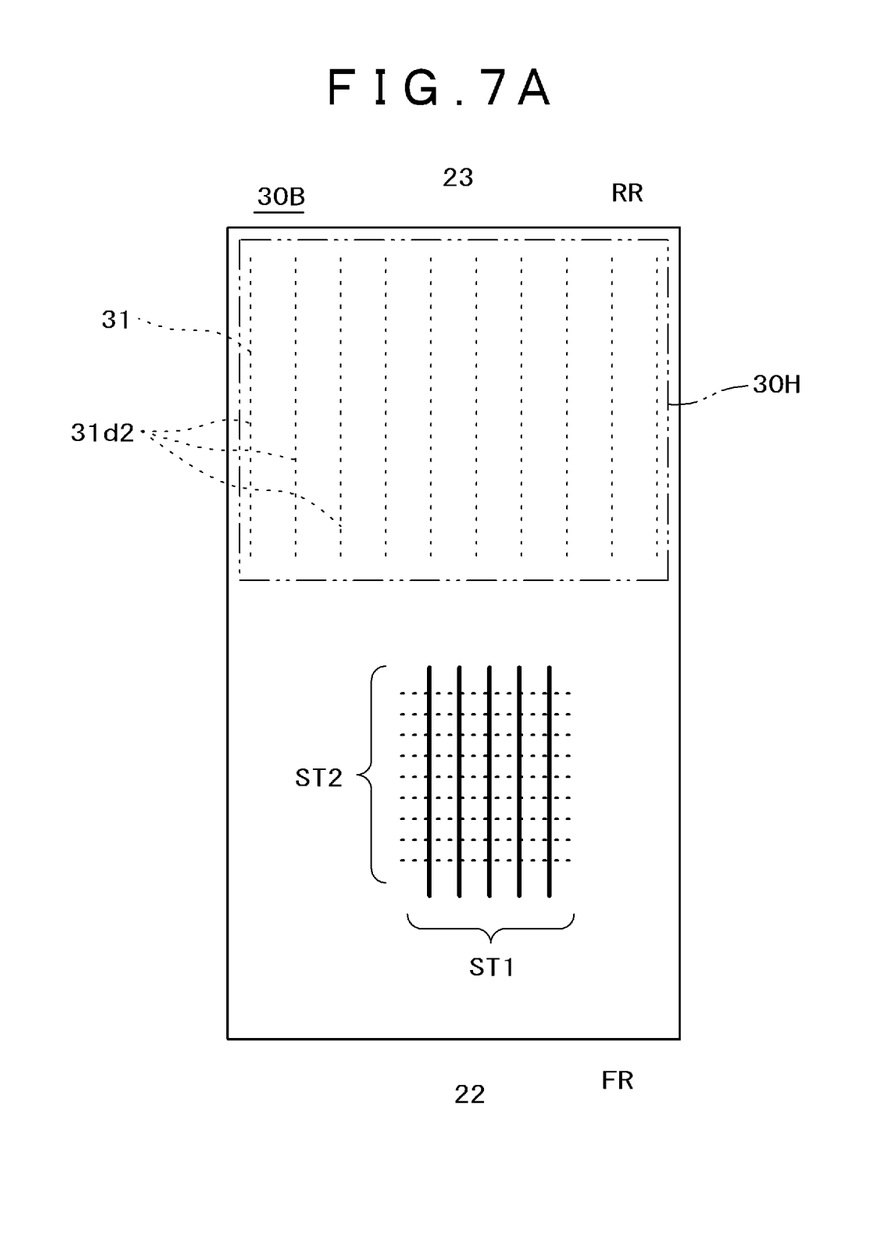
FIG. 7A is a diagram illustrating a second modification of the rigid reinforcement portion in FIG. 5.

FIG. 7A is a diagram illustrating a second modification of the rigid reinforcement portion in FIG. 5. As illustrated in FIG. 7A, the second modification of the rigid reinforcement portion 31 installed in a sheet-shaped elastic material 30B describes an example configuration where a plurality of sewing yarns 31d2 run parallel to one another along the direction C and are installed only within the region 30H of the sheet-shaped elastic material 30B. The sewing yarns 31d2 in FIG. 7A is shorter in length than the sewing yarns 31d in FIG. 5. Therefore, in FIG. 7A, the plurality of sewing yarns 31d2 are sewn on the sheet-shaped elastic material 30B in a shorter time than the case of the sewing yarns 31d in FIG. 5.

Third Modification

Figure 7B:
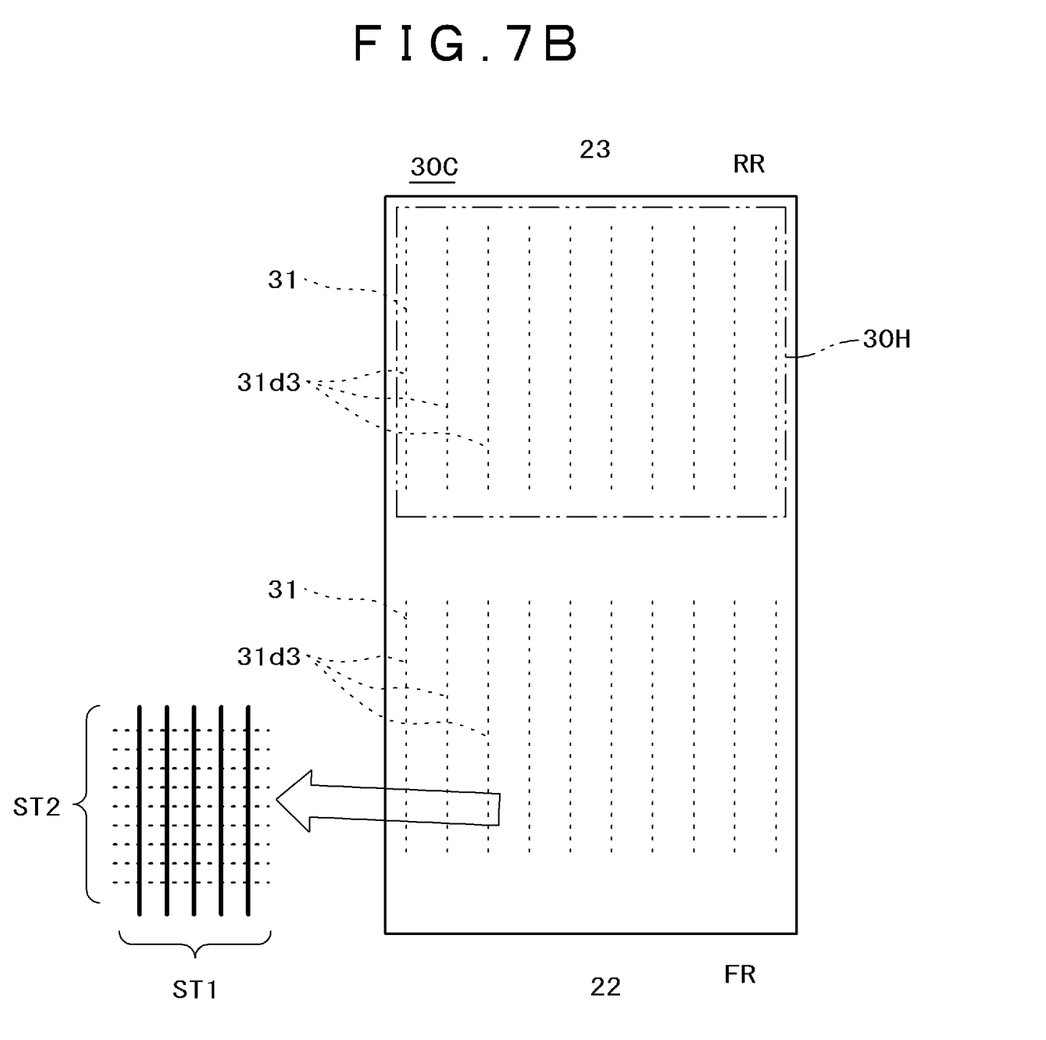
FIG. 7B is a diagram illustrating a third modification of the rigid reinforcement portion in FIG. 5.

FIG. 7B is a diagram illustrating a third modification of the rigid reinforcement portion in FIG. 5. As illustrated in FIG. 7B, in the third modification of the rigid reinforcement portion 31 installed in a sheet-shaped elastic material 30C, the rigid reinforcement portions 31 are installed in two places in the sheet-shaped elastic material 30C. One of the two rigid reinforcement portions 31 is installed within the region 30H of the sheet-shaped elastic material 30C. The other rigid reinforcement portion 31 is installed without the region 30H. In the example, the other rigid reinforcement portion 31 is located between the region 30H and the front pipe frame 22. In each rigid reinforcement portion 31, a plurality of sewing yarns 31d3 are installed to run parallel to one another along the direction C. Even in such a configuration, thus, the amount of stretch in the direction C of the sheet-shaped elastic material 30C is still limited, which in turn may limit the excessive seat deformation (depression) so that the seating comfort can be improved.

It should be understood that the one rigid reinforcement portion 31 and the other rigid reinforcement portion 31 may be the stitches (sewing yarns 31a, 31b, 31c) in FIG. 4.

Fourth Modification

Figure 7C:
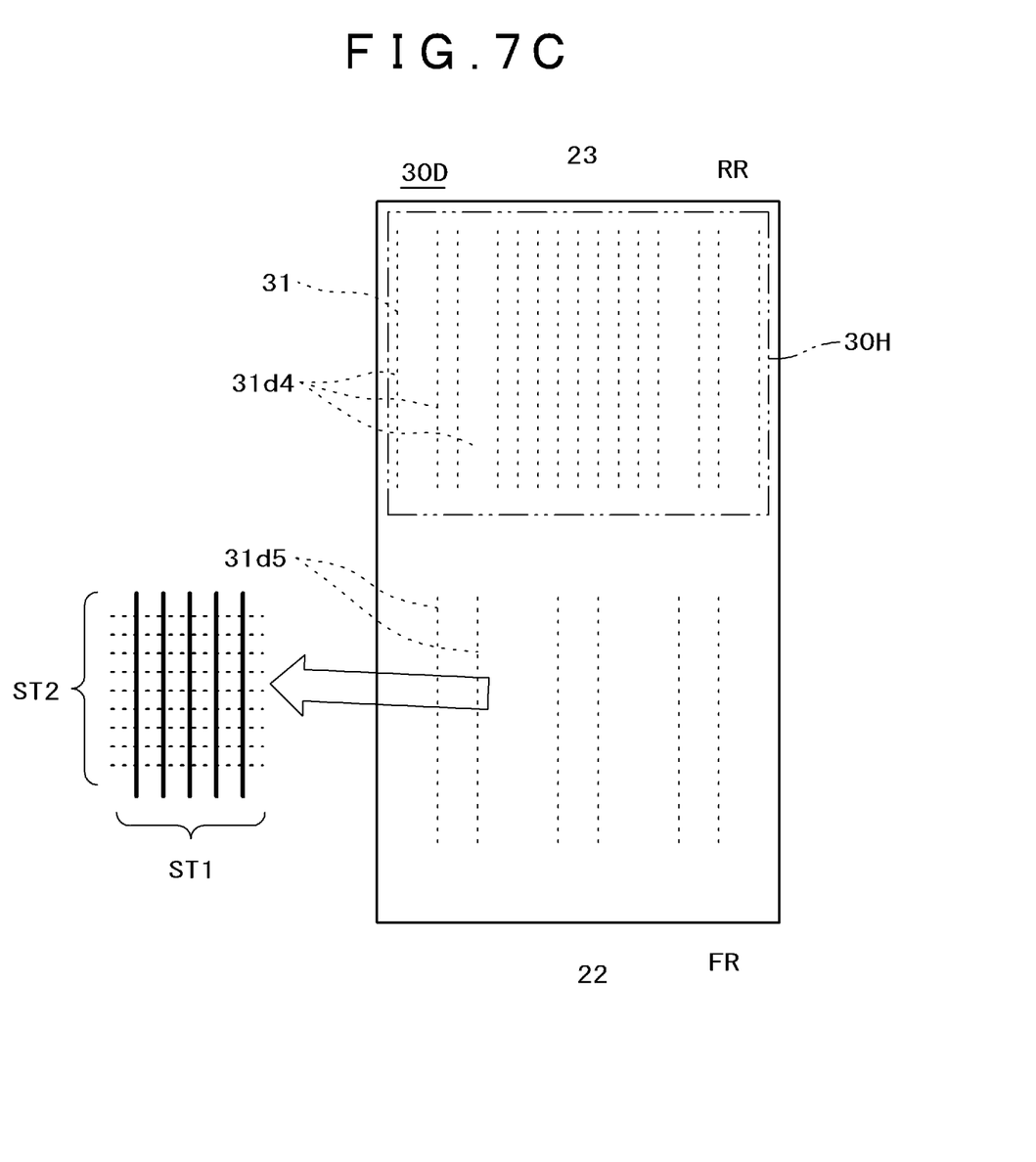
FIG. 7C is a diagram illustrating a fourth modification of the rigid reinforcement portion in FIG. 5.

FIG. 7C is a diagram illustrating a fourth modification of the rigid reinforcement portion in FIG. 5. As illustrated in FIG. 7C, the fourth modification of the rigid reinforcement portion 31 installed in a sheet-shaped elastic material 30D is a modification of the third modification illustrating in FIG. 7B in which the two rigid reinforcement portions 31 are installed. In one of the rigid reinforcement portions 31 that is installed within the region 30H of the sheet-shaped elastic material 30D, a plurality of sewing yarns 31d4 running along the direction C are arranged densely and sparsely. Similarly to the one rigid reinforcement portion 31, in the other rigid reinforcement portion 31 that is installed between the region 30H and the front pipe frame 22, a plurality of sewing yarns 31d5 running along the direction C are arranged densely and sparsely.

In the example, further, the plurality of sewing yarns 31d5 installed in the other rigid reinforcement portion 31 are smaller in number than the plurality of sewing yarns 31d4 installed in the one rigid reinforcement portion 31. Stated another way, the plurality of sewing yarns 31d4 installed in the one rigid reinforcement portion 31 in the region 30H are densely arranged while the plurality of sewing yarns 31d5 in the other rigid reinforcement portion 31 are arranged sparsely as compared to the plurality of sewing yarns 31d4 in the one rigid reinforcement portion 31.

By virtue of such a configuration, the amount of stretch in the direction C of the sheet-shaped elastic material 30D may be adjusted to limit the excessive seat deformation (depression) so that the seating comfort can be improved.

THIRD EXAMPLE CONFIGURATION

Figure 8:
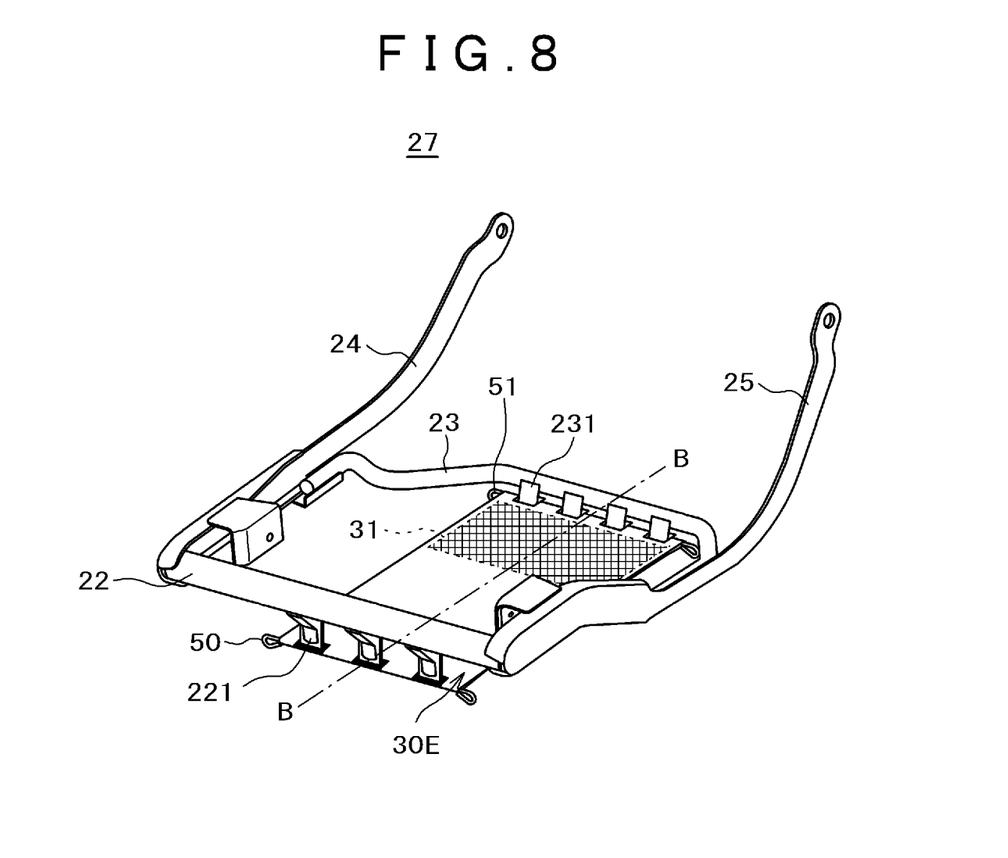
FIG. 8 is a diagram illustrating a third example configuration of a sheet-shaped elastic material installed in a seat cushion frame.
Figure 9:
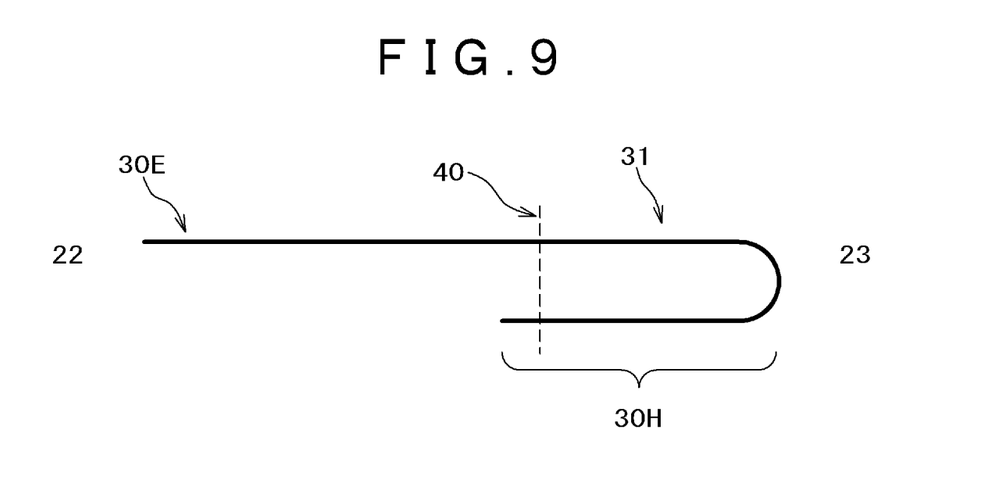
FIG. 9 is a diagram illustrating first cross section structure of the sheet-shaped elastic material in FIG. 8.
Figure 10:
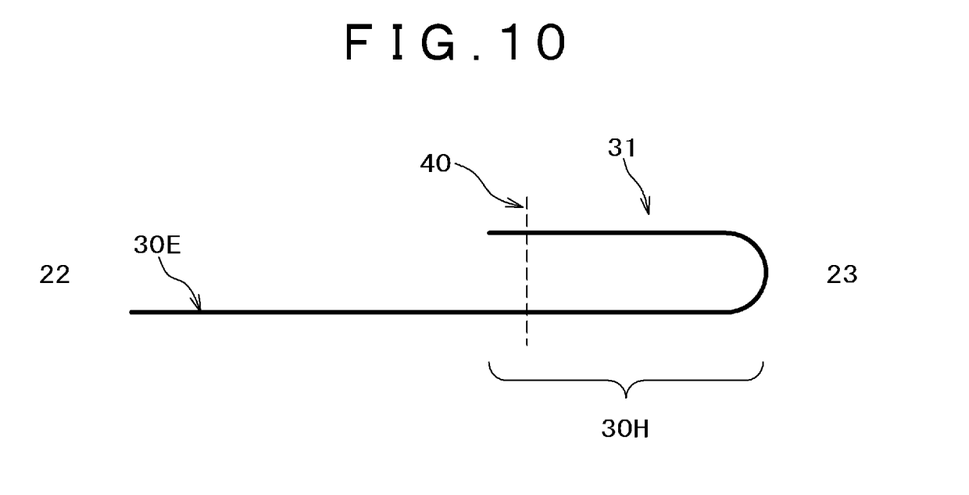
FIG. 10 is a diagram illustrating second cross section structure of the sheet-shaped elastic material in FIG. 8.

FIG. 8 is a diagram illustrating a third example configuration of a sheet-shaped elastic material installed in a seat cushion frame. FIG. 9 is a diagram illustrating first cross section structure of the sheet-shaped elastic material in FIG. 8. FIG. 10 is a diagram illustrating second cross section structure of the sheet-shaped elastic material in FIG. 8.

As illustrated in FIG. 8, the rigid reinforcement portion 31 installed in the region 30H of a sheet-shaped elastic material 30E is formed by folding over and sewing the sheet-shaped elastic material 30E. That is, in the region 30H of the sheet-shaped elastic material 30E, the sheet-shaped elastic material 30E is a two-ply sheet-shaped elastic material, so that the sheet-shaped elastic material 30E increases in thickness. Therefore, by increasing the thickness of the sheet-shaped elastic material 30E, the rigid reinforcement portion 31 provides greater rigidity in the region 30H of the sheet-shaped elastic material 30E.

As illustrated in FIG. 9, the sheet-shaped elastic material 30E is folded downward on the rearward side of the region 30H. Further, on the forward side of the region 30H, the two sheets of the sheet-shaped elastic material 30E are sewn together by the sewing yarn 40 to form the rigid reinforcement portion 31.

Alternatively, as illustrated in FIG. 10, the sheet-shaped elastic material 30E is folded upward on the rearward side of the region 30H. on the forward side of the region 30H, the sheet-shaped elastic material 30E is sewn to the rigid reinforcement portion 31 by the sewing yarn 40 to form the rigid reinforcement portion 31.

This allows the amount of stretch in the direction C (the front-rear direction of the vehicle seat 1, see FIG. 11) of the sheet-shaped elastic material 30E to be limited without increasing components, which in turn may limit the excessive seat deformation (depression) so that the seating comfort can be improved.

Performing the folding and sewing obviates the need to use the fixing member (51) and the like, enabling weight reduction of the vehicle seat 1.

FOURTH EXAMPLE CONFIGURATION

Figure 12:
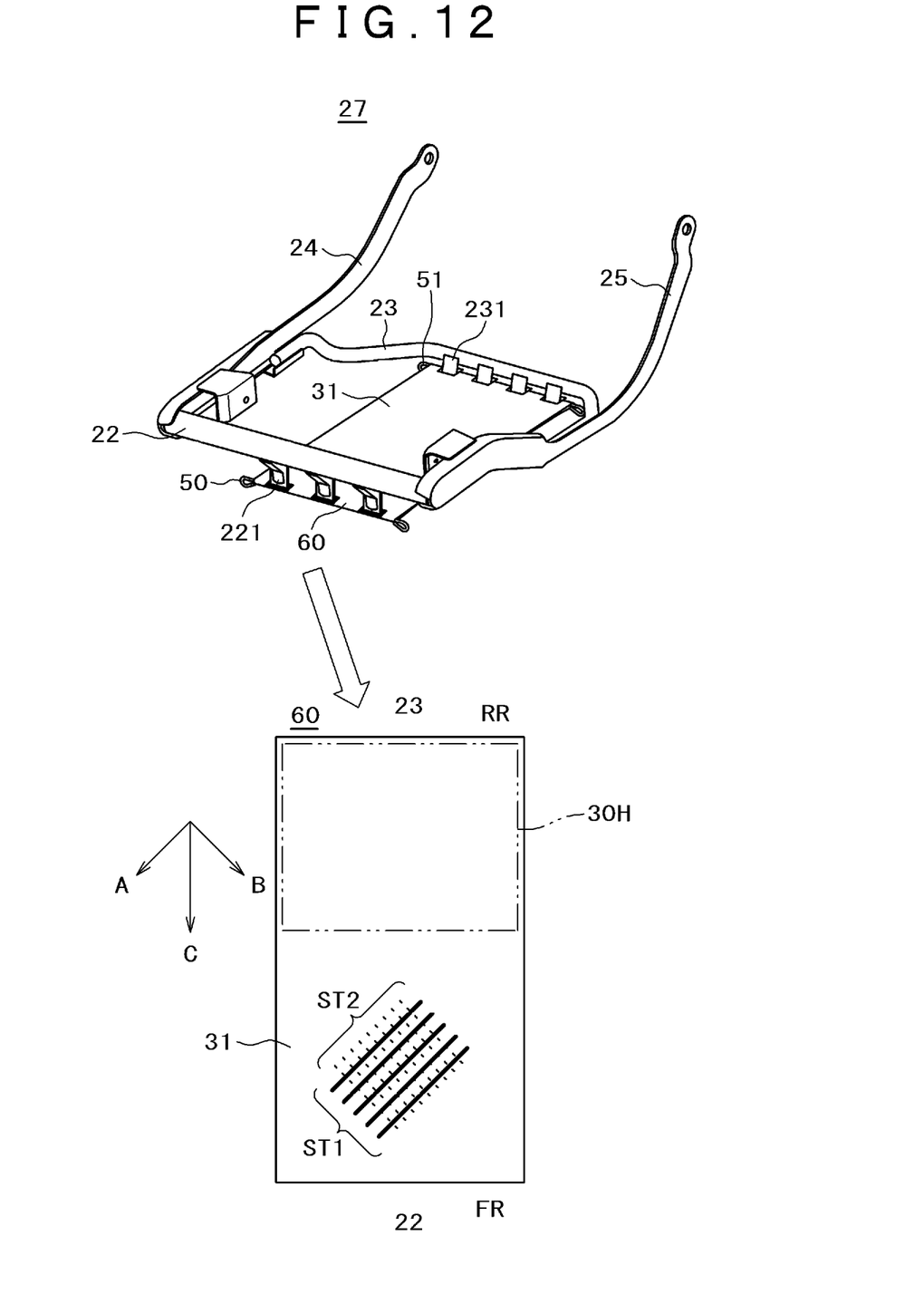
FIG. 12 is a diagram illustrating a fourth example configuration of a sheet-shaped elastic material installed in a seat cushion frame.

FIG. 12 is a diagram illustrating a fourth example configuration of a sheet-shaped elastic material installed in a seat cushion frame.

In a sheet-shaped elastic material 60 of the fourth example configuration, the rigid reinforcement portion 31 is configured by inclining the first direction A along the plurality of high stretch first threads ST1 of the sheet-shaped elastic material 60 from the direction C (the front-rear direction of the vehicle seat 1, see FIG. 11).

As illustrated in FIG. 12, the sheet-shaped elastic material 60 has the plurality of first threads ST1 with high stretchability and the plurality of second threads ST2 with less stretchability than that of the first threads ST1. It may be considered that the first threads ST1 are composed of stretchy threads and the second threads ST2 composed of non-stretchy threads.

The plurality of first threads ST1 run parallel to one another in the first direction A while the plurality of second threads ST2 run parallel to one another in the second direction B crossing the first direction A. The first direction A and the second direction B cross the direction C (the front-rear direction of the vehicle seat 1, see FIG. 11).

Therefore, when a large weight (load) such as buttocks, femoral regions, and the like is applied to the region 30H of the sheet-shaped elastic material 60, the first threads ST1 stretch, but the amount of stretch of the sheet-shaped elastic material 60 is smaller as compared to the case where the length of the first threads ST1 is equal to the length in the front-rear direction (direction C) of the sheet-shaped elastic material 30 as illustrated in FIG. 11. Specifically, the length of the first threads ST1 of the sheet-shaped elastic material 60 is shorter than the length of the first threads ST1 of the sheet-shaped elastic material 30, so that the amount of stretch of the first threads ST1 of the sheet-shaped elastic material 60 is smaller than the amount of stretch of the first threads ST1 of the sheet-shaped elastic material 30.

This allows the amount of stretch in the direction C of the sheet-shaped elastic material 60 to be limited without increasing components, which in turn may limit the excessive seat deformation (depression) so that the seating comfort can be improved.

The angle between the first direction A and the direction C may be, for example, in a range between 30 degrees and 70 degrees, more preferably, in a range between 45 degrees and 60 degrees. However, the amount of stretch of the first threads ST1 varies by properties of the material of first threads ST1. Therefore, the angle between the first direction A and the direction C may be set optimally depending on the properties of the material of the first threads ST1. By virtue of this, the amount of stretch in the direction C of the sheet-shaped elastic material 60 may be adjusted to limit the excessive seat deformation (depression) so that the seating comfort can be improved.

It is to be understood that, as a modification to the sheet-shaped elastic material 60, the rigid reinforcement portion 31 described in FIG. 4 to FIG. 10 may be installed in combination to the sheet-shaped elastic material 60. In this case, the configuration may also produce similar advantageous effects to those as described above.

Although the present invention developed by the inventors has been described in detail with reference to embodiments, it will be apparent that the present invention is not limited to the above embodiments, and various changes and variations can be made to the present invention.

REFERENCE SIGNS LIST

1 . . . vehicle seat
2 . . . seat cushion
3 . . . seatback
20 . . . surface skin
21 . . . cushion pad
22 . . . front pipe frame
23 . . . rear pipe frame
24 . . . right side frame
25 . . . left side frame
27 . . . seat cushion frame
30, 30A, 30B, 30C, 30D, 30E, 60 . . . sheet-shaped elastic material (fabric spring)
30H . . . range corresponding to an occupant's buttocks in the sheet-shaped elastic material
31 . . . rigid reinforcement portion

What is claimed is:
1. A seat for a vehicle, comprising:
a seat cushion; and
a seatback coupled to the seat cushion in a tiltable manner, wherein the seat cushion includes:
    a cushion pad;
    a left side frame;
    a right side frame;

a front frame disposed between a front portion of the right side frame and a front portion of the left side frame;
a rear frame disposed between a rear portion of the right side frame and a rear portion of the left side frame; and
a sheet-shaped elastic material disposed between the front frame and the rear frame to support the cushion pad from below,
the sheet-shaped elastic material including a rigid reinforcement portion to minimize an amount of stretch of the sheet-shaped elastic material in a front-rear direction,
wherein the sheet-shaped elastic material includes:
a plurality of first threads installed to run in the front-rear direction; and
a plurality of second threads installed to run in left-right direction crossing the front-rear direction to be interlaced with the plurality of first threads,
the first threads have higher stretchability than the second threads, and
the rigid reinforcement portion includes a plurality of sewing yarns installed to minimize an amount of stretch of the first threads,
wherein the plurality of sewing yarns include a first sewing yarn, a second sewing yarn, and a third sewing yarn,
the first sewing yarn is essentially composed of a first side, a second side opposite to the first side, a third side running between the first side and the second side, and a fourth side opposite to the third side,
the second sewing yarn is installed between an intersection point of the first side and the fourth side and an intersection point of the second side and the third side, and
the third sewing yarn is installed between an intersection point of the first side and the third side and an intersection point of the second side and the fourth side.

2. A seat for a vehicle, Comprising:
a seat cushion; and
a seatback coupled to the seat cushion in a tiltable manner,
wherein the seat cushion includes:
a cushion pad;
a left side frame;
a right side frame;
a front frame disposed between a front portion of the right side frame and a front portion of the left side frame;
a rear frame disposed between a rear portion of the right side frame and a rear portion of the left side frame; and
a sheet-shaped elastic material disposed between the front frame and the rear frame to support the cushion pad from below,
the sheet-shaped elastic material including a rigid reinforcement portion to minimize an amount of stretch of the sheet-shaped elastic material in a front-rear direction,
wherein the sheet-shaped elastic material includes:
a plurality of first threads installed to run in the front-rear direction; and
a plurality of second threads installed to run in a left-right direction crossing the front-rear direction to be interlaced with the plurality of first threads,
the first threads have higher stretchability than the second threads, and
the rigid reinforcement portion includes a plurality of sewing yarns installed to minimize an amount of stretch of the first threads,
wherein the plurality of sewing yarns run parallel to one another in the front-rear direction.

3. The seat for a vehicle according to claim 2, wherein the plurality of sewing yarns are comparable in length to the sheet-shaped elastic material in the front-rear direction.

4. The seat for a vehicle according to claim 2,
wherein the sheet-shaped elastic material has a region corresponding to buttocks of an occupant in a rear portion of the sheet-shaped elastic material, and
the rigid reinforcement portion is installed in the region.

5. A seat for a vehicle, Comprising:
seat cushion; and
a seatback coupled to the seat cushion in a tiltable manner,
wherein the seat cushion includes:
a cushion pad;
a left side frame;
a right side frame;
a front frame disposed between a front portion of the right side frame and a front portion of the left side frame;
a rear frame disposed between a rear portion of the right side frame and a rear portion of the left side frame; and
a sheet-shaped elastic material disposed between the front frame and the rear frame to support the cushion pad from below,
the sheet-shaped elastic material including a rigid reinforcement portion to minimize an amount of stretch of the sheet-shaped elastic material in a front-rear direction,
wherein the sheet-shaped elastic material includes:
a plurality of first threads installed to run in the front-rear direction; and
a plurality of second threads installed to run in left-right direction crossing the front-rear direction to be interlaced with the plurality of first threads,
the first threads have higher stretchability than the second threads, and
the rigid reinforcement portion includes a plurality of sewing yarns installed to minimize an amount of stretch of the first threads,
wherein the sheet-shaped elastic material has a region corresponding to buttocks of an occupant in a rear portion of the sheet-shaped elastic material,
the rigid reinforcement portion is configured by folding over and sewing the sheet-shaped elastic material in the region, such that the rigid reinforcement portion includes a folded-over portion of the sheet-shaped elastic material and an opposed portion of the sheet-shaped elastic material to which the folded-over portion is sewn in the region, and the folded-over portion substantially covers the region.

* * * * *